(12) United States Patent
Sabet et al.

(10) Patent No.: US 7,257,744 B2
(45) Date of Patent: Aug. 14, 2007

(54) SYSTEM AND METHOD FOR FAULT DIAGNOSIS USING DISTRIBUTED ALARM CORRELATION

(75) Inventors: Sameh A. Sabet, Freehold, NJ (US); Jeffrey A. Deverin, Sayreville, NJ (US); Jonathan M. Liss, Marlboro, NJ (US)

(73) Assignee: Tyco Telecommunications (US) Inc., Morristown, NJ (US)

( * ) Notice: Subject to any disclaimer, the term of this patent is extended or adjusted under 35 U.S.C. 154(b) by 464 days.

(21) Appl. No.: 10/802,255

(22) Filed: Mar. 16, 2004

(65) Prior Publication Data

US 2004/0230868 A1 Nov. 18, 2004

Related U.S. Application Data

(60) Provisional application No. 60/455,136, filed on Mar. 17, 2003.

(51) Int. Cl.
*G06F 11/00* (2006.01)
(52) U.S. Cl. .............. 714/56; 714/25; 714/26; 714/57; 709/224
(58) Field of Classification Search .......... 714/26, 714/43, 25, 57
See application file for complete search history.

(56) References Cited

U.S. PATENT DOCUMENTS

| | | | | |
|---|---|---|---|---|
| 5,107,500 A * | 4/1992 | Wakamoto et al. | ........... | 714/26 |
| 5,123,017 A * | 6/1992 | Simpkins et al. | ............. | 714/26 |
| 5,539,877 A * | 7/1996 | Winokur et al. | ............. | 714/26 |
| 5,640,505 A * | 6/1997 | Hearn et al. | .................... | 714/4 |
| 5,764,955 A * | 6/1998 | Doolan | ........................ | 709/223 |
| 6,012,152 A * | 1/2000 | Douik et al. | ................... | 714/26 |
| 6,205,563 B1 * | 3/2001 | Lewis | .......................... | 714/47 |
| 6,253,339 B1 * | 6/2001 | Tse et al. | ..................... | 714/47 |
| 6,414,595 B1 | 7/2002 | Scrandis et al. | ............. | 340/506 |
| 6,430,712 B2 * | 8/2002 | Lewis | ......................... | 714/47 |
| 6,532,554 B1 * | 3/2003 | Kakadia | ...................... | 714/43 |
| 6,598,033 B2 * | 7/2003 | Ross et al. | .................... | 706/46 |
| 6,603,396 B2 * | 8/2003 | Lewis et al. | ................. | 340/506 |
| 6,633,782 B1 * | 10/2003 | Schleiss et al. | ............... | 700/26 |
| 6,694,455 B1 * | 2/2004 | Scrandis et al. | .............. | 714/31 |
| 6,738,933 B2 * | 5/2004 | Fraenkel et al. | .............. | 714/47 |
| 6,810,496 B1 * | 10/2004 | Vittal | ......................... | 714/57 |
| 6,966,015 B2 * | 11/2005 | Steinberg et al. | ............. | 714/47 |

(Continued)

OTHER PUBLICATIONS

European Search Report for Application No. EP 04 25 1484.4 mailed Jun. 22, 2004.

(Continued)

*Primary Examiner*—Scott Baderman
*Assistant Examiner*—Loan Truong
(74) *Attorney, Agent, or Firm*—Grossman, Tucker, Perreault & Pfleger, PLLC

(57) ABSTRACT

A system and method for diagnosing faults in a communication network using a distributed alarm correlation system. The alarm correlation system may include node-level alarm correlation tools (ACTs) located at nodes in the network to provide node-level alarm correlation producing node-level correlation results. The node-level ACTs may share diagnostic knowledge with other node-level alarm correlation tools at other nodes. Each of the node-level ACTs may also share the diagnostic knowledge and the node-level correlation results with a higher-level ACT. The higher-level ACT may provide higher-level alarm correlation to produce higher-level correlation results.

18 Claims, 7 Drawing Sheets

U.S. PATENT DOCUMENTS

| | | | |
|---|---|---|---|
| 7,007,104 B1* | 2/2006 | Lewis et al. | 709/246 |
| 7,028,228 B1* | 4/2006 | Lovy et al. | 714/57 |
| 7,043,659 B1* | 5/2006 | Klein et al. | 714/4 |
| 7,043,661 B2* | 5/2006 | Valadarsky et al. | 714/4 |
| 7,069,480 B1* | 6/2006 | Lovy et al. | 714/57 |
| 7,082,554 B2* | 7/2006 | Wilson et al. | 714/43 |
| 2001/0013107 A1* | 8/2001 | Lewis | 714/47 |
| 2002/0042847 A1 | 4/2002 | Takats et al. | 709/316 |
| 2002/0050926 A1* | 5/2002 | Lewis et al. | 340/506 |
| 2002/0087680 A1* | 7/2002 | Cerami et al. | 709/224 |
| 2002/0178251 A1 | 11/2002 | Takats et al. | 709/223 |
| 2003/0055960 A1 | 3/2003 | Hain | 709/224 |
| 2003/0149919 A1* | 8/2003 | Greenwald et al. | 714/43 |
| 2004/0078683 A1* | 4/2004 | Buia et al. | 714/37 |

OTHER PUBLICATIONS

Fabre, Eric, "MAGDA—Alarm Supervision In Telecommunication Networks", ERCIM News No. 40, Jan. 2000.

Gardner, Robert D. and Harle, David A., "Fault Resolution and Alarm Correlation in High-Speed Networks using Database Mining Techniques", International Conference on Information, Communications and Signal Processing, ICICS '97, Singapore, Sep. 9-12, 1997, pp. 1423-1427.

G. Jakobson, M. Weissman, L. Brenner, C. Lafond, C. Matheus, GTE Laboratories Incorporated, "GRACE: Building Next Generation Event Correlation Services", 2000, pp. 701-714.

EPO Office Action dated Apr. 15, 2005 received in corresponding EPO Application No. 04 251 484.4 (10 pgs).

* cited by examiner

SYSTEM AND METHOD FOR FAULT
DIAGNOSIS USING DISTRIBUTED ALARM
CORRELATION

CROSS-REFERENCE TO RELATED APPLICATIONS

This application claims the benefit of now abandoned U.S. Provisional Patent Application Ser. No. 60/455,136, filed on Mar. 17, 2003, which is fully incorporated herein by reference.

TECHNICAL FIELD

The present invention relates to fault management systems and more particularly, to a system and method for fault diagnosis using a distributed alarm correlation.

BACKGROUND INFORMATION

The capacity of long-haul communication systems, such as "undersea" or "submarine" systems, has been increasing at a substantial rate. For example, some long-haul optically amplified undersea communication systems are capable of transferring information at speeds of 10 gigabits per second (Gbps) or greater on a single optical channel. In order to maximize the transmission capacity of an optical communication system, a single optical fiber may carry multiple optical channels (e.g., 64 or more) in a process known as wavelength division multiplexing (WDM). Because such a high capacity communication system is particularly subject to risk at various points on the network, network management and remote diagnosis have been used by system owners and operators to meet Service Level Agreements (SLAs).

A simplified communication network 10 is shown in FIG. 1. The communication network 10 is comprised of interconnected equipment referred to as network elements (NE) 12. In an optical communication network, for example, network elements can include transceivers, amplifiers, combiners, splitters, and telemetry equipment. As the number of transmission channels in a fiber and the number of fibers in a cable increases to accommodate the increased capacity of the optical network, the amount of equipment or network elements 12 also increases. Multiple network elements 12 can be housed together at a processing location or node 14, which sometimes is referred to as a cable station in a communication network. Field personnel can be located at the node or cable station to maintain the equipment.

Network management or traffic control activities are coordinated at a Network Management Center (NMC) or centers, 16 connected to the network nodes 14. A Network Management System (NMS) 18 can be located at the NMC 16 to provide data used for proactive maintenance and network capacity planning. One type of NMS 18 provides a comprehensive, graphically integrated view of the network topology for use in monitoring and trouble-shooting activities.

The NMS 18 may responsible for providing fault management by manipulating and storing fault indicators such as network element Quality of Service (QoS) alarms that indicate the violation of SLAs. In addition, the NMS 18 may be used to provide other network management functions such as configuration management, performance management, security management, and accounting management. At the high-level NMC 16, operators using the NMS 18 may access and/or manage network components (e.g., the individual nodes and/or network elements). At some nodes 14, field personnel can be given access to the NMS screens pertaining to equipment under their control or remotely managed nodes.

Using the NMS 18, network operators may diagnose and maintain communication networks using a centralized approach. The NMS 18 maintains a centralized decision process using a centralized server and an operator at the NMC 16 essentially coordinates management across the whole network. Correlation rules and topological configuration information are centrally located for the entire network and a centralized alarm correlation and root cause analysis is performed. This centralized approach to fault diagnosis often excludes expert knowledge distributed throughout the NMC area of control and does not adequately adapt to changes in network topology. In a global network where nodes may be widely distributed geographically, command and control issues may also arise.

Accordingly, there is a need for a system and method for fault diagnosis that shares any new diagnostic knowledge between the nodes and distributes the alarm correlation to local points or nodes in the network. There is also a need for a system and method for fault diagnosis that provides hierarchical processing at both the node level and at a higher level.

SUMMARY

Consistent with one aspect of the present invention, a method is provided for diagnosing faults in a communication network using distributed alarm correlation and rules. The method includes correlating alarm data at a first network node to produce local correlation results, and replicating diagnostic knowledge to a neighboring network node, the diagnostic knowledge being obtained in response to the local correlation results.

Consistent with another aspect of the present invention, the method for diagnosing faults includes receiving alarm data locally at network nodes in the communication network and correlating the alarm data locally at the network nodes using a node-level alarm correlation tool to produce correlation results at each of the network nodes. The correlation results produced locally at the network nodes are reported to respective users at respective network nodes and any diagnostic knowledge provided by at least one of the users is added to a local knowledge base at a respective network node. The diagnostic knowledge and the correlation results produced locally at the network nodes are reported to a higher-level alarm correlation tool.

Consistent with a further aspect of the present invention, a distributed alarm correlation system is provided for diagnosing faults in a communication network. The system includes a plurality of node-level alarm correlation tools located at nodes in the communication network and at least one higher-level management level alarm correlation tool located at a network management center in the communication network. Each of the node-level alarm correlation tools provides node-level alarm correlation to produce node-level correlation results and share diagnostic knowledge with other node-level alarm correlation tools at other nodes. Each of the node-level alarm correlation tools also shares the diagnostic knowledge and the node-level correlation results with the higher-level management level alarm correlation tool. The higher-level management level alarm correlation tool provides higher-level alarm correlation to produce higher-level correlation results.

Consistent with yet another aspect of the present invention, a machine-readable medium whose contents cause a computer system to perform a method of fault diagnosis in a communication network the method including correlating alarm data at a first network node to produce local correlation results; and replicating diagnostic knowledge to a second network node, the diagnostic knowledge being obtained in response to the local correlation results.

BRIEF DESCRIPTION OF THE DRAWINGS

These and other features and advantages of the present invention will be better understood by reading the following detailed description, taken together with the drawings wherein.

DETAILED DESCRIPTION

In general, a system and method for fault diagnosis consistent with the invention may distribute alarm correlation across network nodes to leverage local expertise in building diagnostic knowledge. The diagnostic knowledge may be replicated across the nodes to facilitate "learning" across the network. The system and method for fault diagnosis consistent with the invention may use a hierarchical processing scheme in which alarm correlation is performed at the node level and at a higher level (e.g., a network level) to facilitate diagnosing faults both locally and globally across a network. Although the exemplary embodiments are described in the context of an undersea optical communication network, a system and method for fault diagnosis consistent with the invention may be used in any type of network.

Figure 1:
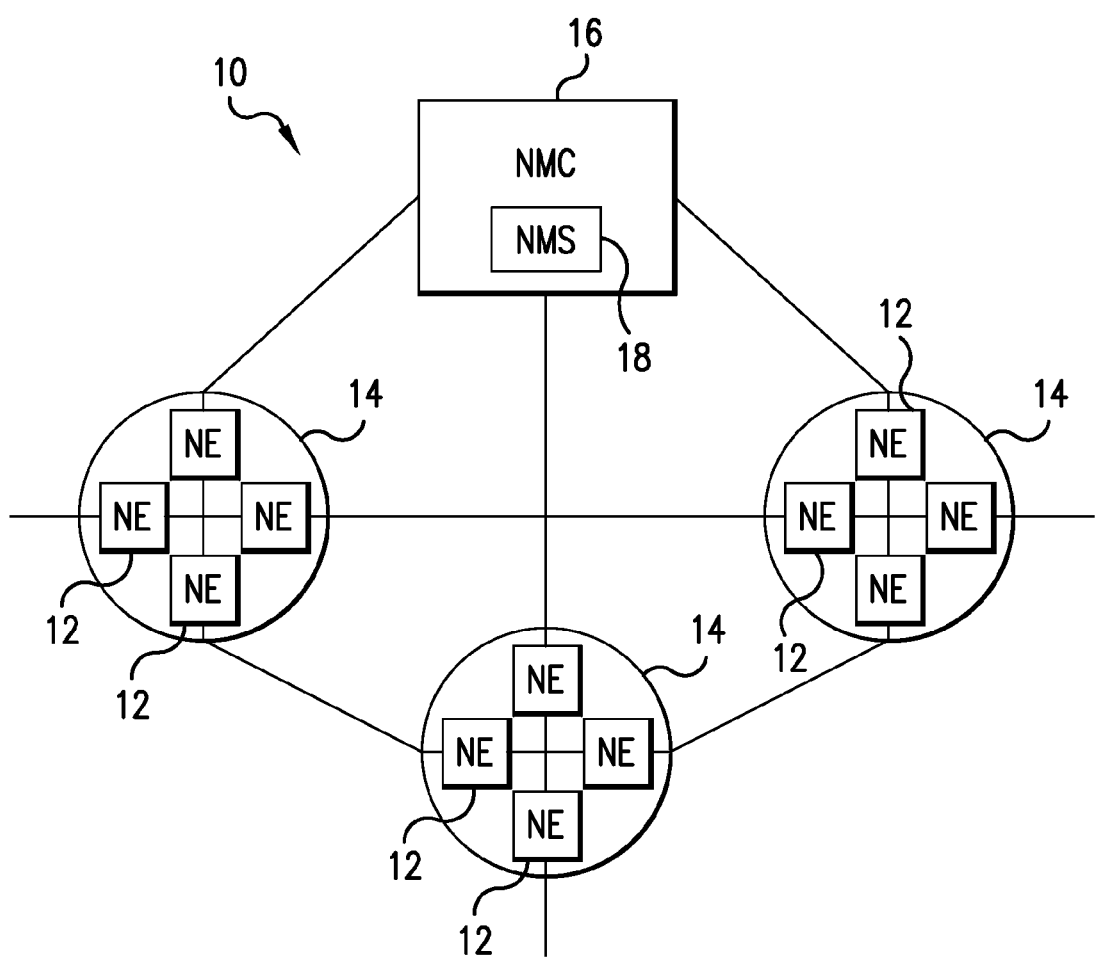
FIG. 1 is a schematic diagram illustrating a simple network topology.
Figure 2:
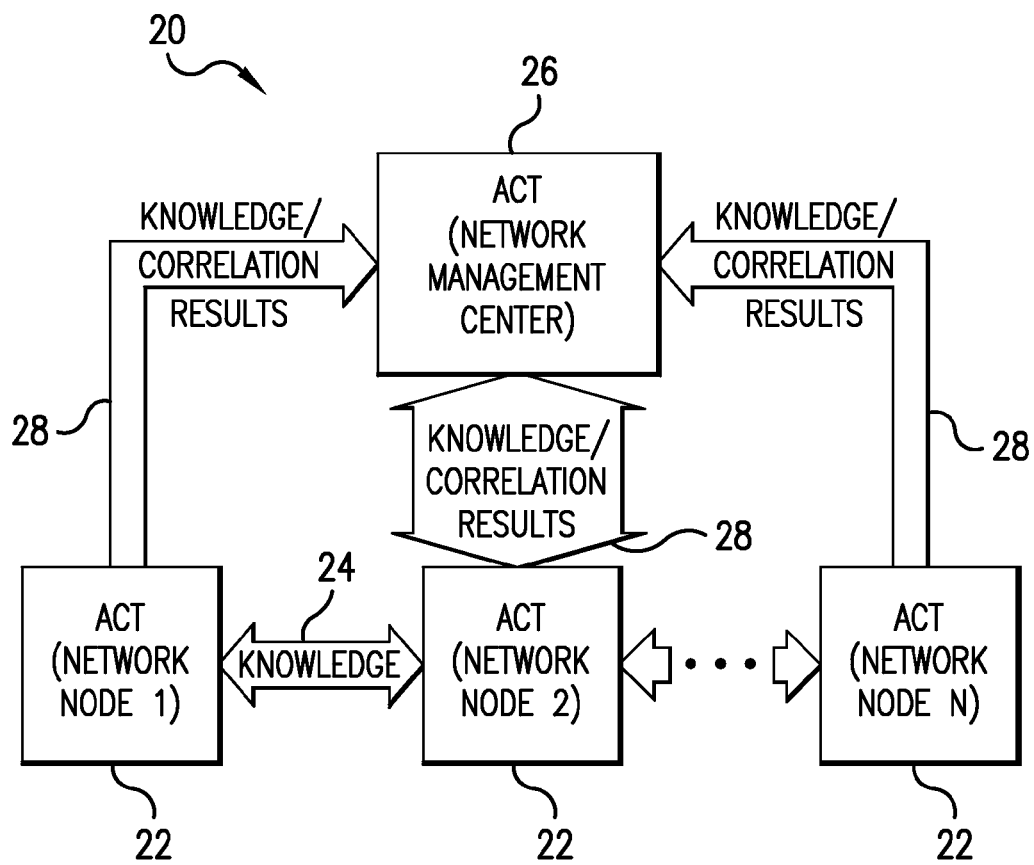
FIG. 2 is a functional block diagram of one embodiment of a distributed, hierarchical alarm correlation system consistent with the present invention.

Referring to FIG. 2, a distributed, hierarchical alarm correlation system 20, according to one exemplary embodiment of the present invention, is described in greater detail. The system 20 generally includes node-level alarm correlation tools (ACTs) 22 installed at each node and at least one higher-level ACT 26. In an exemplary communication network, the node-level ACTs 22 may be installed at each cable station and the higher-level ACT 26 may be installed at a network management center (NMC). The ACTs 22, 26 are preferably integrated with a network management system (NMS) (not shown) to diagnose the faults reported to the NMS. In general, each of the ACTs 22, 26 uses a rules-based approach to identify the-root cause of a fault scenario and report a corrective action, if one exists. The ACTs 22, 26 within the alarm correlation system 20 may be synchronized, e.g. via a GPS receiver, so that they all operate using a common time standard.

Each node-level ACT 22 may receive alarm data and provide alarm correlation and filtering at the local level. The local alarm correlation may be performed using local topology configuration information and local correlation rules to perform a node root cause analysis. The local topology information may include local network element information and interconnectivity information for network elements co-located in that node. This local alarm correlation produces local correlation results (e.g., a root cause and/or corrective action). The personnel or user at each node-level ACT 22 may review the local correlation results and may add new diagnostic knowledge such as correlation rules, root causes, and corrective actions. Each node-level ACT 22 may communicate with a neighboring node-level ACT 22 to share any newly acquired diagnostic knowledge 24. The distributed alarm correlation and sharing of diagnostic knowledge allows for faster fault diagnosis at the local level and leverages the expertise of node-level management personnel.

Each node-level ACT 22 may also report any new diagnostic knowledge and the correlation results 28 to the higher-level ACT 26. The higher-level ACT 26 may provide a higher-level alarm correlation using higher-level correlation rules and topology configuration information to produce higher-level correlation results. The higher-level topology configuration information may include interconnectivity information for the nodes (e.g., representing the overall network topology). The higher-level ACT 26 at a NMC, for example, may include complete end-to-end topology information for a trail (i.e., an end-to-end connection pertaining to a specific customer circuit) and may use this trail information to provide an end-to-end root cause analysis and to determine that many customers may be affected by the same root cause fault. The knowledge base at the higher level may thus be simplified to focus on the interconnectivity between nodes, rather than all equipment installed in the network.

Figure 3:
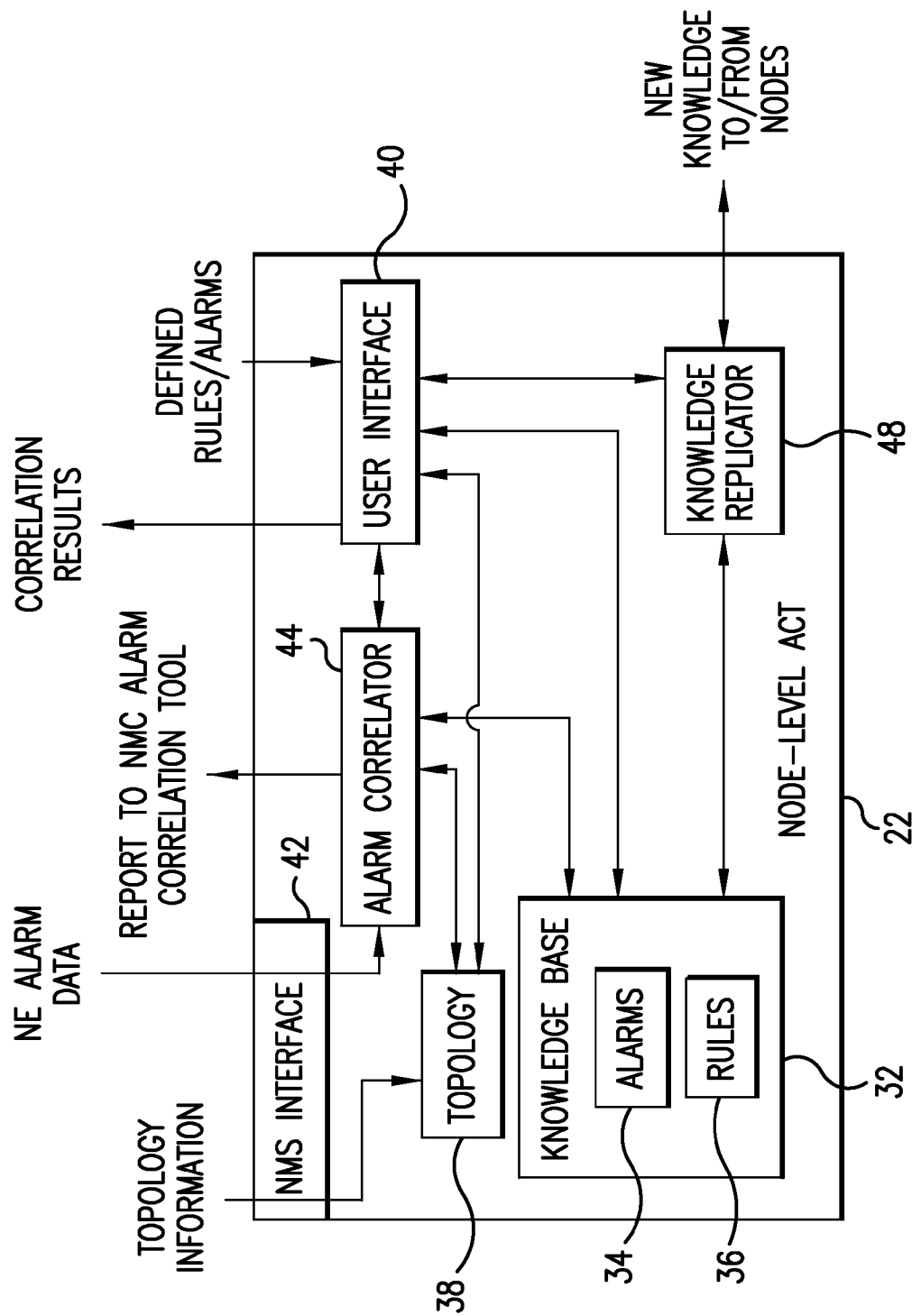
FIG. 3 is a functional block diagram of one embodiment of a node-level alarm correlation tool consistent with the present invention.

One embodiment of a node-level ACT 22 that may be installed at each node is shown in FIG. 3. The illustrated exemplary node-level ACT 22 includes a local knowledge base 32 of alarm definitions 34 and predefined local correlation rules 36 and includes local topology configuration information 38. The node-level ACT 22 also includes functional components for handling various functions of the node-level ACT. A user interface 40 handles user interaction and the transfer of data to and from the user. A NMS interface 42 handles the receipt of data and information from a NMS. An alarm correlator 44 handles the alarm correlation and a knowledge replicator 48 handles the replication of new knowledge to other nodes.

The alarm definitions 34 may include categories of alarms. When the alarms are defined into categories, correlation rules can be defined that apply to a group of alarms in a category. In an exemplary embodiment, alarm groups may include: a transmission (trail) alarm/event due to signal or link degradation; an equipment alarm/event due to a network element fault; a causal alarm/event that causes an alarm in a downstream element (e.g., in a receiver); a caused alarm/event that is caused by an upstream element (e.g., by a transmitter); a primary alarm/event on a specific element; and a secondary alarm/event on a specific element, which is caused by a primary alarm.

The predefined correlation rules 36 correspond to likely alarm/fault scenarios indicating where a fault or problem is located in the network based on a particular set of coexistent alarms. For the specific alarm scenarios, correlation rules 36 may be defined and customized by the local personnel for each node. One example of a node-level scenario in an optical communication network is as follows: if a receiver side amplifier reports a failure and the receiver side transceivers connected to the amplifier report Incoming Signal Loss (ISL) alarms, the root cause can be diagnosed as the amplifier failure. In an exemplary embodiment, the correlation rules 36 may Boolean-based rules in the form of relational Boolean statements that specify the root cause and/or corrective action when specific sets of alarms are active. The Boolean statements may also include temporal attributes for facilitating fault analysis based on alarm or event reporting time.

The node-level topology configuration information 38 may define the non-coincidental relationships between the various network elements (of the same or different types) so that it can be combined with the correlation rules 36 to analyze the alarm data acquired from the NMS. The topology configuration information 38 may be transferred from the NMS. The user may enter or override the topology configuration information acquired automatically from the NMS allowing for correction based on local expertise.

The alarm correlator 44 may combine the predefined correlation rules 36 with the topology information 38 and the alarm definitions 34 to analyze the incoming alarm data. In an exemplary embodiment, the NE alarm data reported to the NMS is received by the ACT 22 and the user may initiate a diagnostic run to analyze the current alarm scenario as it is transferred from the NMS. By applying a set of rules to the alarm data, the alarm correlator 44 may identify the likely cause of the alarm. The alarm correlator 44 may report the correlation results (e.g., the root cause) to the user to allow the user to review the results. The alarm correlator 44 may also report the correlation results to the higher-level ACT (e.g., at the NMC).

The alarm correlator 44 may be implemented using correlation algorithms known to those of ordinary skill in the art for parsing correlation rules and applying them to alarm data. Alarms may be correlated temporally in which case the correlation algorithms assume that all alarms are time stamped to the same clock and adjust the time lag between parent and children alarms. If no pre-defined correlation rules 36 are available for a scenario, then a generic algorithm may be executed to correlate the alarms. Such generic correlation algorithms for fault diagnosis are generally known to those of ordinary skilled in the art.

The knowledge replicator 48 may transfer any new diagnostic knowledge added by the user to the other nodes. The new knowledge can include alarm definitions, correlation rules, root causes, corrective actions and/or topology information. The knowledge replicator 48 may also receive new knowledge from the other nodes and add the new knowledge to the knowledge base 32, if appropriate, so that the databases are replicated. The knowledge replicator 48 may be implemented using techniques known to those of ordinary skill in the art for transferring information between nodes in a network.

Figure 4:
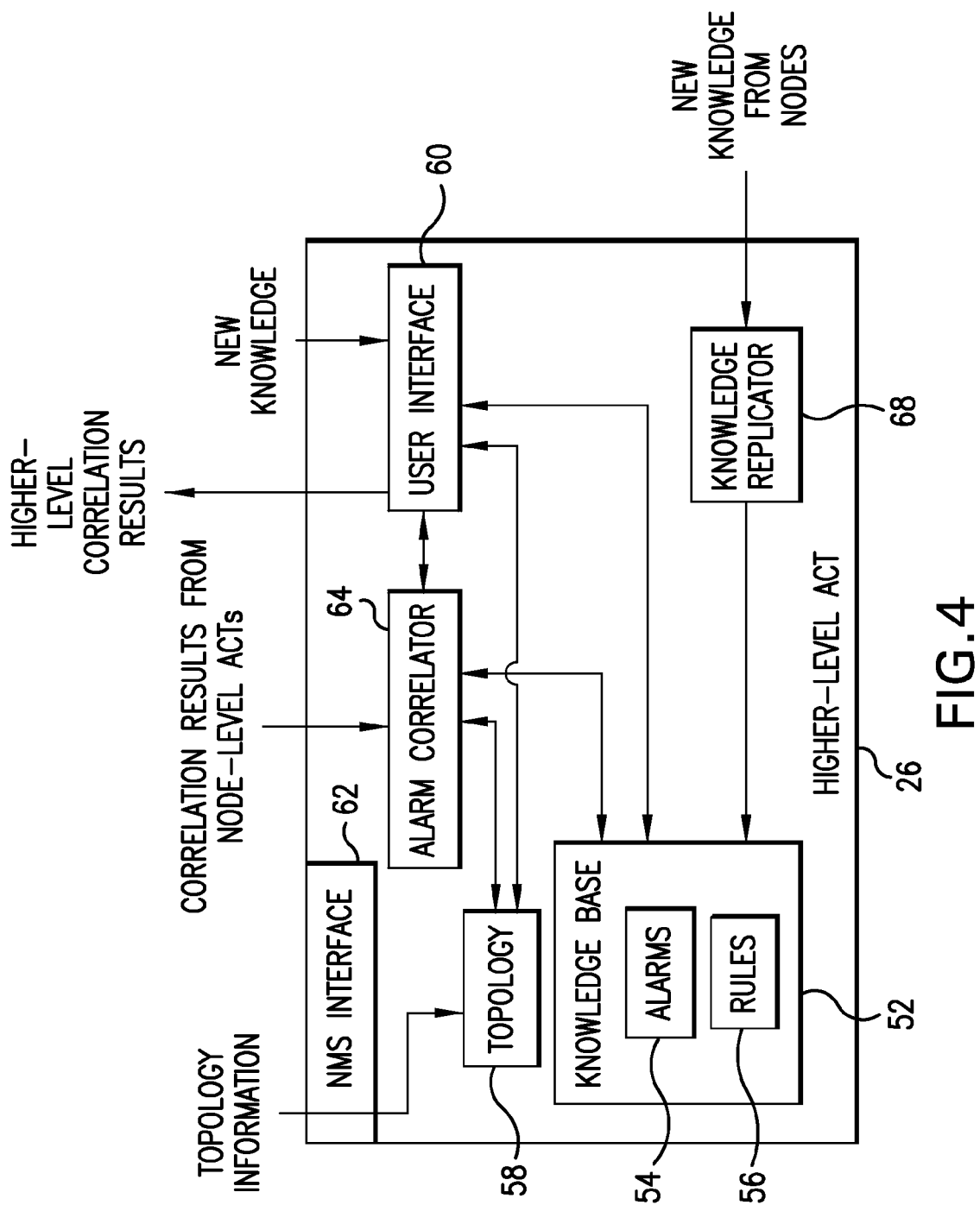
FIG. 4 is a functional block diagram of one-embodiment of a higher-level alarm correlation tool consistent with the present invention.

One embodiment of an exemplary higher-level ACT 26 consistent with the invention is shown in FIG. 4. The illustrated higher-level ACT 26 includes a local knowledge base 52 of alarm definitions 54 and predefined local correlation rules 56 and includes higher-level topology configuration information 58. The higher-level ACT 26 also includes functional components for handling various functions of the higher-level ACT. A user interface 60 may handle user interaction and the transfer of data to and from the user. A NMS interface 62 may handle the receipt of data and information to the NMS. An alarm correlator 64 may handle the alarm correlation, and a knowledge replicator 68 may be provided to receive the replicated knowledge from the nodes.

The alarm definitions 54, the correlation rules 56, and the topology configuration information 58 in the higher-level ACT 26 may be implemented similar to the node-level ACT 22, but may relate to a higher-level fault diagnosis that focuses on the nodes and links connecting the nodes rather than on the network elements within the nodes. For example, the correlation rules 56 may correspond to likely alarm/fault scenarios at the network level and the topology configuration information 58 may define relationships between the nodes in the network.

Figure 5:
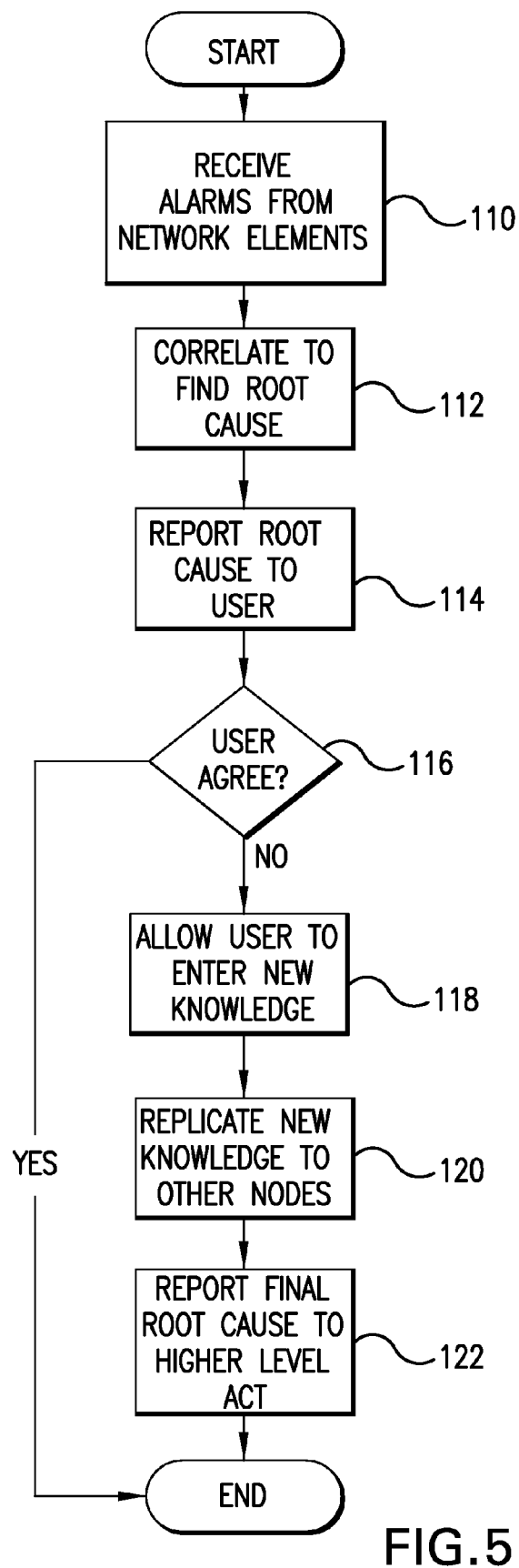
FIG. 5 is a block flow diagram illustrating an exemplary alarm correlation process at the node level consistent with the present invention.

FIG. 5 is a block flow diagram of one example of a node-level alarm correlation process consistent with the present invention. The block flow diagrams used herein to describe various embodiments include particular sequences of steps. It can be appreciated, however, that the sequence of steps merely provides an example of how the general functionality described herein can be implemented. Further, each sequence of steps does not have to be executed in the order presented unless otherwise indicated.

In the exemplary embodiment illustrated in FIG. 5, alarm data is received from network elements 110. The alarm data is correlated to find a root cause 112, and the root cause is reported to the user 114. The alarm data may be correlated by using the predefined correlation rules to find a root cause and/or by using a generic correlation algorithm to find a root cause. If the user determines that new diagnostic knowledge should be added 116 (e.g., if the user disagrees with the conclusion of the correlation), the user is allowed to add new diagnostic knowledge 118. Adding new diagnostic knowledge includes, without limitation, adding a new correlation rule, adding a corrective action to be taken based on a root cause, and/or modifying a correlation rule by changing a root cause or corrective action. New diagnostic knowledge entered by the user may be replicated to the neighbor nodes 120 (e.g., via a LAN/WAN). The final root cause (determined as a result of the correlation and any new diagnostic knowledge provided by the user) may be reported to the higher level ACT, step 122.

Figure 6:
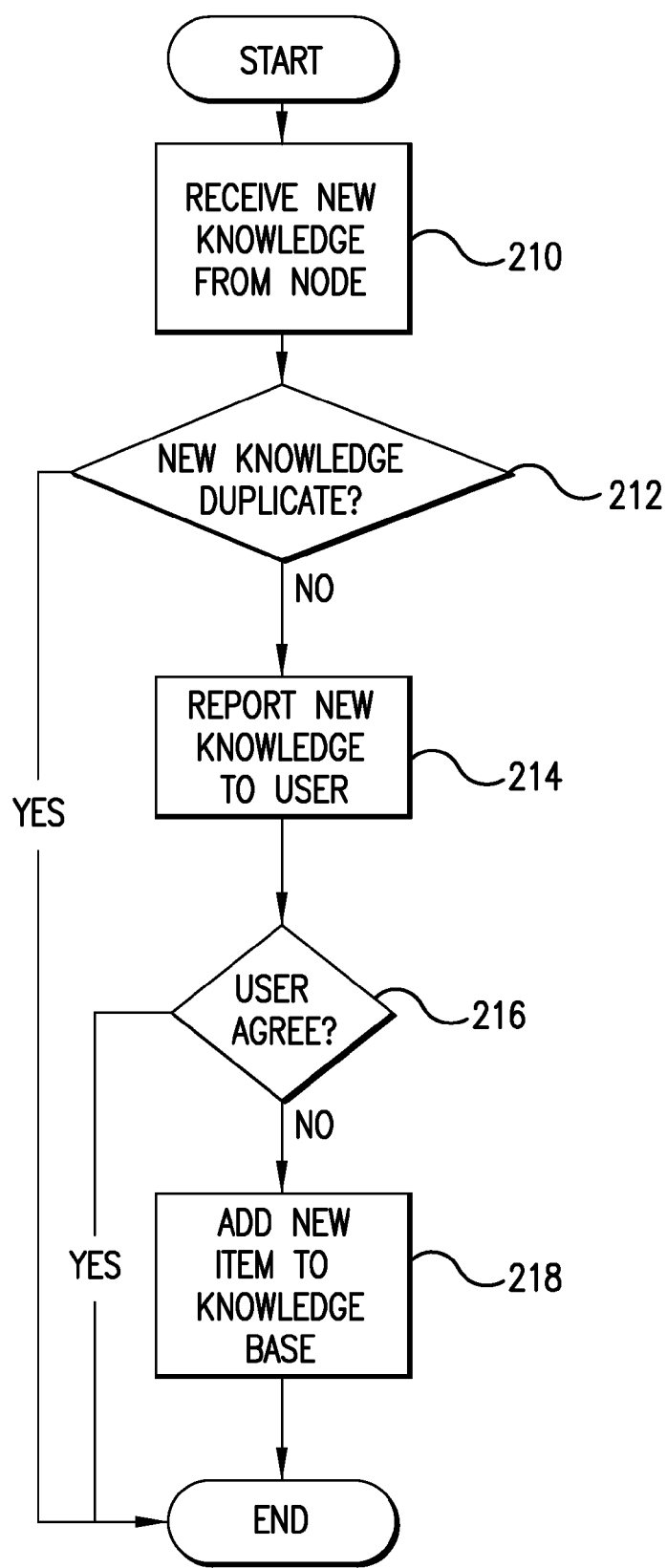
FIG. 6 is block flow diagram illustrating an exemplary knowledge replication process consistent with the present invention.

One example of a new diagnostic knowledge replication process is illustrated in FIG. 6. In the illustrated exemplary embodiment, the new diagnostic knowledge is received from a neighboring node 212. If the new diagnostic knowledge does not duplicate knowledge already in the local knowledge base 214, the new diagnostic knowledge may be reported to the user 216. If the user agrees with the new diagnostic knowledge 218, the new diagnostic knowledge may be added into the knowledge base 220.

Figure 7:
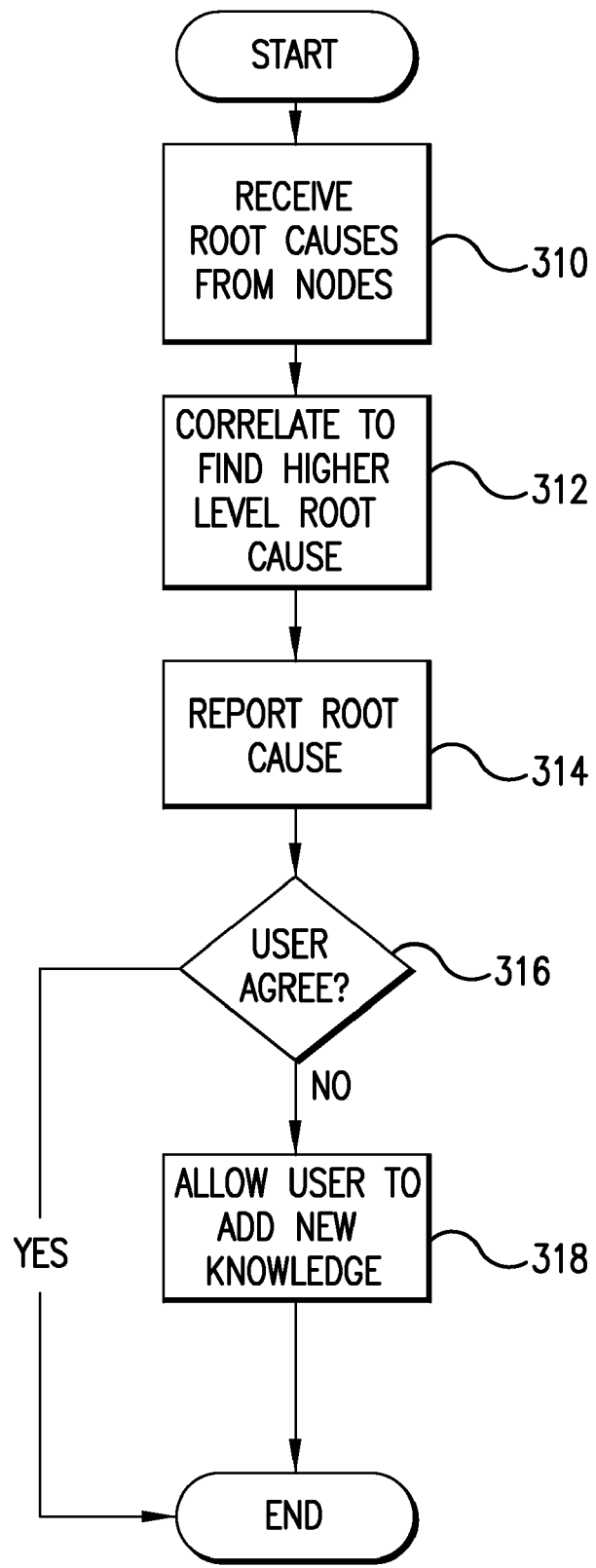
FIG. 7 is block flow diagram illustrating an exemplary higher-level alarm correlation process consistent with the present invention.

One example of a higher-level correlation process is illustrated in FIG. 7. In the illustrated exemplary embodiment, root causes are received from the nodes 312 and correlated to find the higher-level root cause 314. The higher-level correlation may use correlation rules to find the higher-level root cause and/or a generic correlation algorithm. The higher-level root cause may be reported to the user 316. If the user determines that new diagnostic knowledge should be added 318 (e.g., if the user disagrees with the higher-level correlation conclusion), the user may be allowed to add new diagnostic knowledge 318.

Embodiments of the system and method for fault diagnosis and the alarm correlation system can be implemented as a computer program product for used with a computer system. Such implementation includes, without limitation, a series of computer instructions that embody all or part of the functionality previously described herein with respect to the system and method. The series of computer instructions may be stored in any machine-readable medium, such as semiconductor, magnetic, optical or other memory devices, and may be transmitted using any communications technology, such as optical, infrared, microwave, or other transmission technologies. It is expected that such a computer program product may be distributed as a removable machine-readable medium (e.g., a diskette, CD-ROM), preloaded with a computer system (e.g., on system ROM or fixed disk), or distributed from a server or electronic bulletin board over the network (e.g., the Internet or World Wide Web).

Those skilled in the art should appreciate that such computer instructions can be written in a number of programming languages for use with many computer architectures or operating systems. For example, preferred embodiments may be implemented in a procedural programming language (e.g., "C") or an object oriented programming language (e.g., "C++" or Java). Alternative embodiments of the invention may be implemented as pre-programmed hardware elements or as a combination of hardware and software.

Accordingly, a system and method for diagnosing faults, consistent with the present invention, provides a mechanism to leverage and share local field personnel's intimate knowledge of the cable station layout and equipment. This knowledge can then be used to diagnose higher-level abstracted problems, for example, at the network level. Thus, learned scenarios become shared knowledge by dynamically distributing them to other nodes and to the NMC.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A method for diagnosing faults in a communication network using distributed alarm correlation, said method comprising:
   receiving alarm data locally at network nodes in said communication network;
   correlating said alarm data locally at each of said network nodes using an associated node-level alarm correlation tool and diagnostic knowledge stored in an associated node-level knowledge base to produce correlation results identifying a root cause of a fault determined at each of said network nodes;
   reporting said correlation results produced locally at said network nodes to respective users at respective said network nodes;
   adding new diagnostic knowledge provided by at least one of said users to one of said node-level knowledge bases, said new diagnostic knowledge being obtained by said at least one of said users using said correlation results associated with at least one of said network nodes;
   replicating said new diagnostic knowledge to at least one other node-level knowledge base associated with at least one other said network node; and
   reporting said new diagnostic knowledge and said correlation results produced locally at said network nodes to a higher-level alarm correlator; and
   correlating said root causes determined at said network nodes using said higher-level alarm correlator to find a higher-level root cause.

2. The method of claim 1 wherein said correlating said alarm data comprises using user-defined correlation rules to find said root causes.

3. The method of claim 1 wherein said new diagnostic knowledge comprises a new correlation rule.

4. The distributed alarm correlation system of claim 3 wherein each of said node-level alarm correlation tools comprises local topology configuration information.

5. The method of claim 1 wherein said new diagnostic knowledge comprises at least one of a root cause, an alarm definition, and a corrective action.

6. The method of claim 1 wherein said alarm data comprises alarm data generated by network elements in said communication network.

7. The method of claim 1 wherein said diagnostic knowledge comprises local topology configuration information.

8. The method of claim 1 wherein said diagnostic knowledge comprises alarm definitions and correlation rules.

9. The method of claim 1 further comprising:
   adding said diagnostic knowledge to a node knowledge base at said other said network nodes.

10. The method of claim 1 further comprising:
    reporting said higher-level root cause to a user of said higher-level alarm correlator; and
    adding higher-level diagnostic knowledge provided by said user at said higher-level alarm correlator to a higher-level knowledge base in said higher-level alarm correlator.

11. The method of claim 1 further comprising receiving and storing local topology configuration information at respective said network nodes.

12. A distributed alarm correlation system for diagnosing faults in a communication network, said distributed alarm correlation system comprising:
    a plurality of node-level alarm correlation tools located at nodes in said communication network, wherein each of said node-level alarm correlation tools is configured to provide node-level alarm correlation to produce node-level correlation results identifying a root cause of a fault determined at an associated one of said nodes and to share new diagnostic knowledge produced by a user of said node-level alarm correlation tool using said node-level correlation results with other of said node-level alarm correlation tools at other nodes; and
    at least one higher-level management level alarm correlation tool located at a network management center in said communication network, wherein each of said node-level alarm correlation tools is configured to share said new diagnostic knowledge and said node-level correlation results with said higher-level management level alarm correlation tool, and wherein said higher-level management level alarm correlation tool is configured to provide higher-level alarm correlation to produce higher-level correlation results identifying a higher-level root cause.

13. The distributed alarm correlation system of claim 12 wherein each of said node-level alarm correlation tools comprises alarm definitions defining alarm groups categorizing alarms generated in said communication network.

14. The distributed alarm correlation system of claim 12 wherein each of said node-level alarm correlation tools includes a local knowledge base.

15. The distributed alarm correlation system of claim 12 wherein each said higher-level alarm correlation tool includes a higher-level knowledge base.

16. The distributed alarm correlation system of claim 12 wherein each of said node-level alarm correlation tools includes an alarm correlator for correlating network element alarm data with locally stored topology configuration information using user-defined correlation rules.

17. A machine-readable medium storing an executable set of software instructions that are executable by a computer system to cause the computer system to perform a method of fault diagnosis in a communication network said method comprising:

receiving alarm data locally at network nodes in said communication network;

correlating said alarm data locally at each of said network nodes using an associated node-level alarm correlation tool and diagnostic knowledge stored in an associated node-level knowledge base to produce correlation results identifying a root cause of a fault determined at each of said network nodes;

reporting said correlation results produced locally at said network nodes to respective users at respective said network nodes;

adding new diagnostic knowledge provided by at least one of said users to one of said node-level knowledge bases, said new diagnostic knowledge being obtained by said at least one of said users using said correlation results associated with at least one of said network nodes;

replicating said new diagnostic knowledge to at least one other node-level knowledge base associated with at least one other said network nodes; and reporting said new diagnostic knowledge and said correlation results produced locally at said network nodes to a higher-level alarm correlator; and correlating said root causes determined at said network nodes using said higher-level alarm correlator to find a higher-level root cause.

18. The machine-readable medium of claim 17, wherein said method further comprises:

reporting said higher-level root cause to a user of said higher-level alarm correlator; and adding higher-level diagnostic knowledge provided by said user at said higher-level alarm correlator to a higher-level knowledge base in said higher-level alarm correlator.

* * * * *